Dec. 25, 1928.  
W. E. RUPLEY  
1,696,455  
CIRCULAR SEAM WELDING APPARATUS  
Filed April 13, 1925
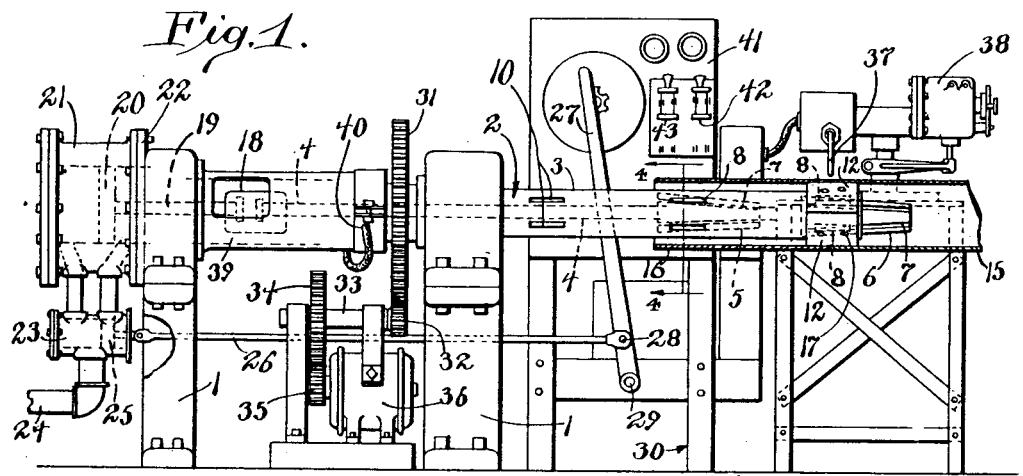
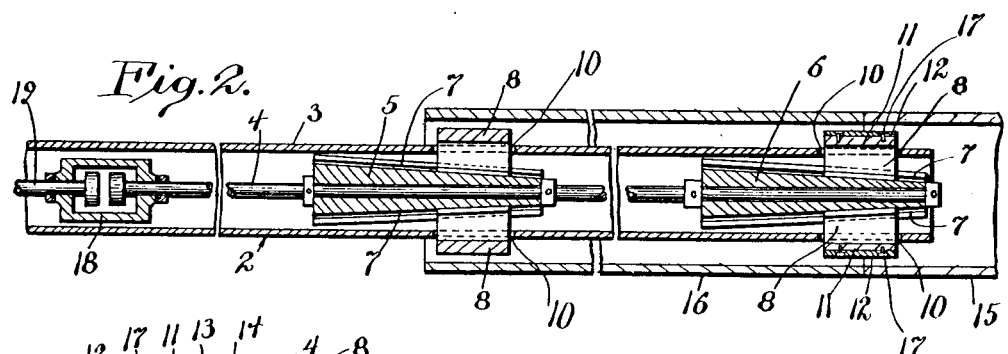
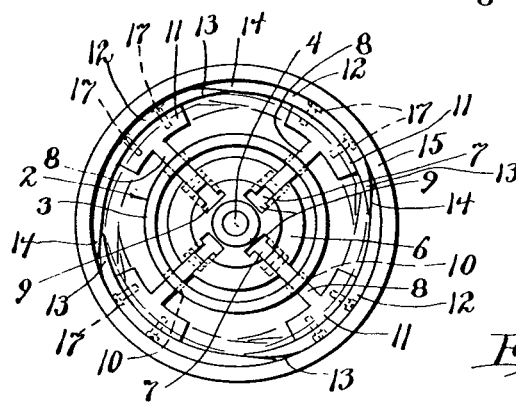
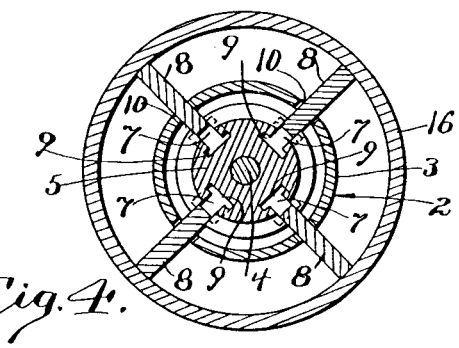
Inventor  
William E. Rupley.  
By Lyon & Lyon  
Attorneys Patented Dec. 25, 1928.

1,696,455

UNITED STATES PATENT OFFICE.

WILLIAM E. RUPLEY, OF LOS ANGELES, CALIFORNIA, ASSIGNOR TO WESTERN PIPE & STEEL COMPANY OF CALIFORNIA, OF SAN FRANCISCO, CALIFORNIA, A CORPORATION OF CALIFORNIA.

CIRCULAR-SEAM-WELDING APPARATUS.

Application filed April 13, 1925. Serial No. 22,833.

This invention relates to circular seam welding apparatus, and is more particularly directed to a means for supporting the aligned two separate sections of material which it is desired to weld, in a manner to prevent the burning through of the material during the welding operation. In the welding of sections of material together, it is important that the sections of material be supported and perfectly aligned and held in position so that the welding connection formed will be true and accurate and of sufficient strength to maintain the members positively so that the material during the welding operation will not spring out of position to break the weld formed, and so that the material, when so welded together, will be so aligned as to form a continuous member.

In welding material together, particularly in the welding of circular seams, it is important that during the welding operation the material be supported from one side to prevent the material when rendered in a fluid condition from flowing into the interior of the member and burning, due to the contact with the oxygen of the air, when so heated. It is, therefore, an object of this invention to provide an apparatus for supporting and aligning cylindrical portions of material so that the same may be either lap or butt welded, and which supporting and aligning means provide a welding end over which the welding is performed so as to prevent the burning of the material during the welding operation.

Another object of this invention is to provide a welding apparatus for aligning and supporting cylindrical objects during the welding operation, which is automatically rotated while forming the weld.

Other objects and advantages of this invention will be apparent from the following detailed description of a preferred embodiment thereof, as illustrated in the accompanying drawings.

In the drawings:

Fig. 1 is a side elevation of a welding apparatus embodying this invention.

Fig. 2 is a fragmental sectional side elevation of a mandrel as embodied in this invention for forcing the supporting members and die holding members outward to engage sections of cylindrical material.

Fig. 3 is an end elevation looking from right to left in Fig. 2, and illustrates anvil members expanded to force the material to be welded into alignment and providing a solid welding surface over which the weld is formed and in dotted lines shows the anvil members contracted.

Fig. 4 is an end, sectional elevation taken substantially on the line 4—4 of Fig. 1.

In the preferred embodiment of this invention shown in the drawings, 1 indicates a pair of standards for rotatably supporting a mandrel 2 which mandrel 2 includes an outer casing 3 enclosing an operating rod 4 which extends forward through the casing 3 and is connected to a pair of cone mandrel heads 5, 6; respectively.

The mandrel heads 5 and 6 are provided with inclined slots 7 into which wedge members 8 are dove-tailed, as illustrated at 9. The wedge members 8 extend outward through slots 10 formed in the casing 3, which slots 10 prevent longitudinal movement of the members 8. The members 8, which are dovetailed within the mandrel head 6, are provided at their upper end with shoes 11, to which shoes 11 welding anvils 12 are secured and which welding anvils 12 are bevelled at one side 13 downwardly, and at the opposite side 14 upwardly so as to permit the different anvil members 12 to overlap so as to provide a continuous welding surface on the anvil and to provide a means for positively forcing the two sections of material 15 and 16, which it is desired to weld together, into perfect alignment, when the anvil members 12 are in the expanded position as illustrated in Fig. 3. The anvil members 12 are secured to the heads 11 of the members 8 by any suitable means, such as the set screws 17, which are countersunk into the surface of the anvil members 12. By means of beveled edges 13 and 14 on each anvil 12, the anvil members 12 are permitted to overlap when contracted from the holding and aligning position.

Means are provided for driving the mandrel heads 5 and 6 forward to expand the members 8 and the welding anvils 12 into position to properly hold and align the members 15 and 16, which means are preferably as follows:

The rod 4 is connected to a sliding flexible coupling box 18 within which a fluid, such as oil, is inserted and a piston rod 19 is likewise connected within the coupling box 18. The piston rod 19 connects with a piston 20, which is adapted to reciprocate within a cylinder 21 secured to the rearward support 1, as illustrated at 22. Fluid pressure is supplied to the opposite faces of the piston 20 to either drive the mandrel heads 5 and 6 forward to expand the members 8 or to retard the members 8 to allow the removal or positioning of the sections of material 15 and 16 to be welded.

The fluid is supplied to actuate the piston 20 through a piston valve 23 through a conduit 24 from a source of fluid pressure, not shown. The piston 25 of the valve 23 is connected to an actuating arm 26 which extends forward and is pivotally connected to a control lever 27 at a pin 28 which lever 27 is pivotally secured at the pin 29 to a standard 30.

Means are provided for rotating the mandrel 2, during the welding of the members 15 and 16 together, which means preferably comprise a drive gear 31 secured to the casing 3 by any suitable means and adapted to mesh with a pinion 32 mounted on a countershaft 33 to which countershaft 33 a gear 34 is secured in position to mesh with a gear 35 mounted on the shaft of a motor 36, which motor 36 is preferably an electric motor as illustrated. The mandrel 2 is rotated very slowly during the welding operation by this means when the members 8 are expanded so as to properly support and hold the members 15 and 16, and the members 15 and 16 are rotated so that a continuous and uniform welded seam connection is formed between the said members. The current is supplied for electric welding of the members 15 and 16 together through an electrode 37 which is supplied with current through any suitable means such as that illustrated at 38 which is well understood in the art. The opposite or ground connection for the electric weld is connected to the mandrel housing 39 as illustrated at 40. A control board 41 is illustrated upon which switches 42 and 43 are mounted for the control of the motor 36 and apparatus 38, respectively.

Having fully described the preferred embodiment of this invention, it is to be understood that it is not intended that this invention should be limited to the exact form herein set forth, which may obviously be varied in detail without departing from the spirit of the appended claims.

I claim:

1. In an apparatus of the class described, the combination of a mandrel including a rod, a casing surrounding the rod, a tapered mandrel head secured to the said rod, a plurality of expanding members dove-tailed to said head and extending through slots formed in the outer casing, means for moving the said rod longitudinally in the said casing so as to move the mandrel head relative to the said expanding members, and means operably connected with the outer casing for rotating the said mandrel.

2. In an apparatus of the class described, the combination of a mandrel including a plurality of spaced mandrel heads having inclined surfaces, inclined slots formed in the inclined surfaces, wedge members slidably mounted in the slots and extending outwardly from the said mandrel heads, means for maintaining the wedge members from longitudinal movement, means for forcing the heads longitudinally to cause the wedge members to slide in the said slots, the wedge members of one of said mandrel heads being provided with overlapping anvil members having tapered edges, which, when expanded, provide a continuous cylindrical periphery adapted to be engaged with the end sections of two tubular members to force the same into alignment for welding.

Signed at Los Angeles, California, this 6th day of February, 1925.

WILLIAM E. RUPLEY.